United States Patent Office 3,329,271
Patented July 4, 1967

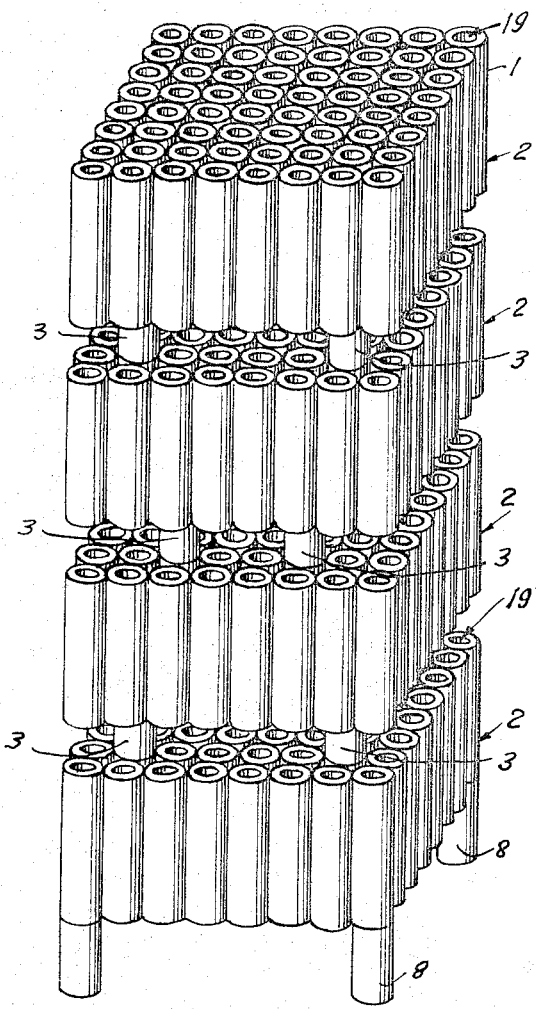
Fig. I
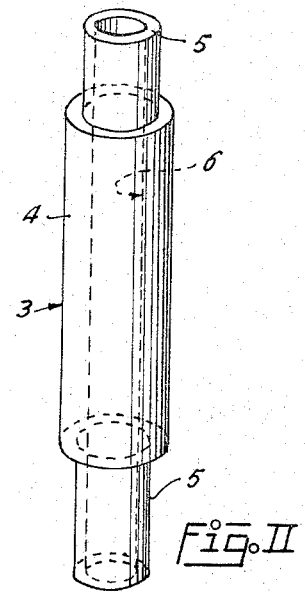
Fig. II
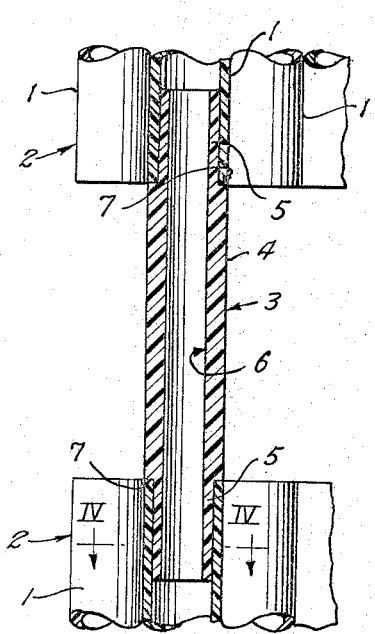
Fig. III
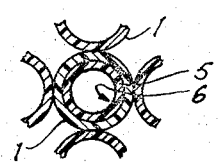
Fig. IV
INVENTORS
Mansel W. Smith &
Thomas D. Ward
BY Howard E. Moore
ATTORNEY

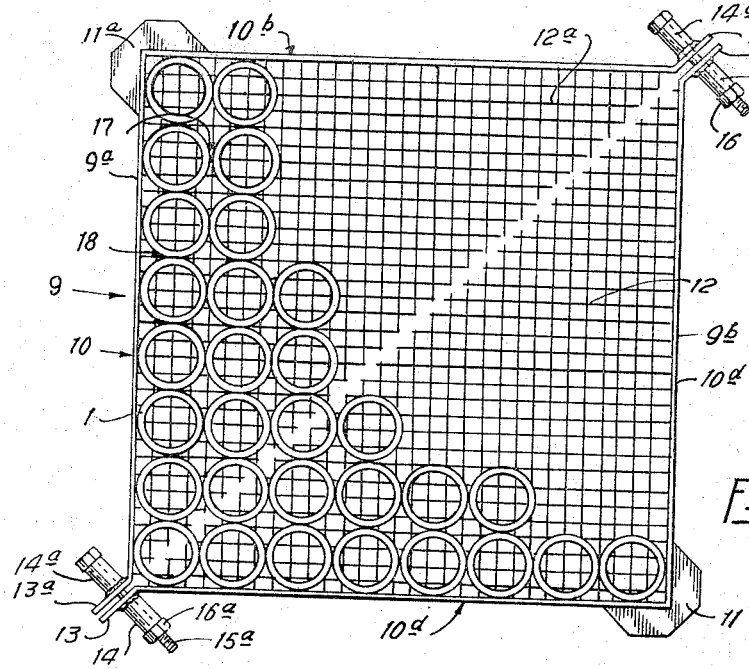
Fig. V
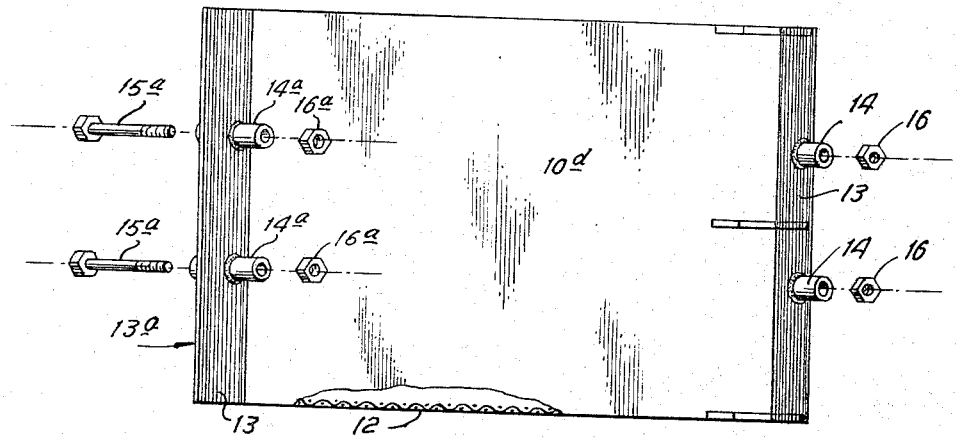
Fig. VI
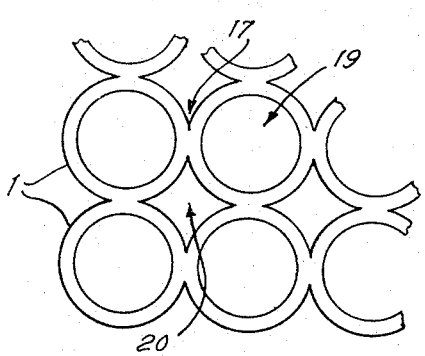
Fig. VII
INVENTORS
Mansel W. Smith &
Thomas D. Ward
BY Howard E. Moore
ATTORNEY

3,329,271
TRICKLING FILTER MEDIA
Thomas D. Ward, Mineral Wells, and Mansel Watt Smith, Austin, Tex., assignors to Texas Vitrified Pipe Company, Mineral Wells, Tex., a corporation of Texas
Filed June 21, 1962, Ser. No. 204,256
1 Claim. (Cl. 210—150)

This invention is concerned with sewage treatment equipment, and is particularly concerned with a trickling filter media used in sewage filtration and the method of making said filter media.

In sewage treatment the liquid sewage, with suspended solids therein, is normally subjected to a primary treatment process to remove the larger solids, either by allowing the solids to settle out of the liquid, or by removing the larger solids by a screening process.

The waste liquid is then subjected to a secondary treatment process, either by chemical precipitation, activated sludge process, or a trickling filter process.

The trickling filter process for removing solids from the sewage liquid after the primary treatment, is a common method of sewage filtration, but subject to certain shortcomings, as will be hereinafter recited.

The trickling filter process involves the sprinkling of the waste-laden liquid over a bed of filter media, unusually by means of a perforated rotating dispersal pipe. As the liquid trickles over the filter media surface, the organic material contained in it is trapped or absorbed by the micro-organisms that are growing on the media.

The filter media commonly employed is a bed of rock, usually 6 to 8 feet in depth of varying sized particles, usually from 2 to 4 inches in diameter, which provides spaces between the rocks through which the fluid trickles to deposit the organic material on the bacterial flora growing on the surfaces thereof.

As the liquid, containing organic matter, trickles down over the surface of the rock or other filter media, there is developed a micro-biological growth, commonly known as "stalk" bacteria, which grow by attaching themselves to the solid surfaces by means of stalks.

The micro-organisms grow at the outer ends of the stalk, which protrudes from the rock or other filter media surface. As more and more of these bacteria develop on the filter media surfaces, there is formed a relatively thick layer of porous bacterial growth. As the sewage trickles down through such layer the suspended organic material in the fluid is trapped on the bacterial growth, thus absorbing the organic material. The "stalk" bacteria are aerobic organisms, and require a plentiful supply of oxygen in order to grow and thrive.

As the microbial growth on the surface of the filter media becomes thicker, it becomes increasingly more difficult for oxygen-carrying air to reach the base of the stalks, and the air will be completely closed off at some points. At these points an anaerobic condition develops, wherein anaerobic bacteria will begin to grow. Anaerobic bacteria thrive only in conditions where there is no oxygen. Anaerobic bacteria will digest the aerobic stalks, thus loosening same from the point of attachment, thereby causing pieces of the aerobic bacterial slime to slough off from the media surface and be carried by the sewage fluid into the effluent of the filter.

When the trickling filter bed is put into operation, it is seeded by exposing same to activated sludge sprinkled thereover, and usually takes several days before the filter media surfaces are covered with the proper bacterial growth in order to provide an effective filter.

When the bacterial flora has established itself on the surface of the filter media, a rapid multiplication of the bacteria will normally insure a continuous reseeding with the proper bacteria in the normal secondary sewage effluent.

In the use of rock filter media, the sewage effluent is sprinkled over the top of the bed of rock and will seek the most direct path to the bottom of the filter. Thus the fluid may flow over the upper surface of the rocks near the surface of the bed, but as the flow progresses downward in the bed, it will usually form a series of channels through the bed, and there will be areas in the bed which are either not exposed to the flow of fluid, or exposed very little to the flow of fluid over the surface thereof.

It is apparent that the bacterial slime which provides the filtration in the bed will be formed only on the surfaces of the filter media which is wetted by the sewage effluent. Thus the effective surface of the filter media would be only that surface on which the bacterial flora develops, which may represent only a small percentage of the total surface of the rocks within the bed.

Furthermore, by reason of the uneven and irregular flow and distribution of effluent and air through the rock bed, anaerobic bacteria growth sets in, causing the slime to slough off, creating foul odors, accumulation of undesirable bacterial growth and the breeding of flies. Moreover, the pile of rock filter media must be supported by a solid wall which limits or prevents air circulation through the bed, which is necessary for the healthy growth of the aerobic organisms. It is desirable that the aerobic organisms be supplied with a plentiful supply of oxygen to promote growth and to prevent the development and growth of anaerobic organisms, inasmuch as the aerobic organisms do not create undesirable odors, whereas the anaerobic organisms release excessive amount of gases and undesirable odors.

Furthermore, in the use of the rock bed filter it is difficult to maintain a temperature within the rock bed of optimum value to encourage aerobic organism growth inasmuch as circulation of air therethrough is limited. The lowering of the temperature in the filter bed reduces the development of the aerobic organisms, so that it is desirable to be enabled to circulate and distribute air of the correct temperature through the filter media to maintain this desired temperature value.

It will be seen from the foregoing that the use of rock filter media in trickling filters, and other filter medias which obstruct or cause the circuitous flow of fluid and air, have been found undesirable.

From the foregoing it may be concluded that the most effective type of filter media would include the following basic criteria:

(1) It should have the maximum effective contact area with the sewage effluent passing therethrough and be housed in a minimum space.

(2) The opening sizes should be selected so that any normal solid particle will pass therethrough, and the openings should be unobstructed passages arranged in vertical alignment so that the fluid will not have to take a circuitous path through the filter media.

(3) The filter media passages should be of a configuration to give the maximum surface area contact for a given overall area.

(4) The passages through the media should be free of obstruction or abrupt turns to prevent stoppage and clogging by sloughing and to permit continuous flow and scouring by flow of fluid thereover to remove decomposing bacterial growth, thus preventing blockage and the growth of anaerobic bacteria. Flies cannot breed in a place where there is direct water flow.

(5) The combined filter media must permit maximum air flow therethrough, and all filter surfaces must be exposed to air flow to encourage the growth of aerobic bacteria, and discourage the growth of anaerobic bacteria.

The present invention is intended to provide a filter media which satisfies all of these basic criteria.

Therefore, among the objects to be achieved by this invention, are the following:

(A) A trickling filter media which encourages continuous sloughing of small quantities of expiring organisms rather than mass sloughing, thereby reducing clogging of the passages therethrough to a minimum.

(B) A trickling filter media which allows the maximum air circulation and ventilation through the filter and over substantially all of the exposed surfaces therein.

(C) A trickling filter media which includes the maximum of effective area contact surfaces exposed to the flow of fluid thereover.

(D) A filter media which reduces the emission of undesirable gases and odors to a minimum.

(E) A trickling filter media which reduces fly breeding therein to a minimum.

(F) A trickling filter media wherein maximum air circulation is attained whereby a desirable temperature and oxygen supply for maximum growth of aerobic bacteria, and minimum growth of anaerobic bacteria, is maintained.

(G) To provide a method of fabricating a trickling filter media which meets all of the above listed criteria and objects.

Other and further objects of the invention will become apparent upon reading the detailed specification hereinafter following, and by referring to the drawings annexed hereto.

A suitable embodiment of the filter media and equipment for performing the process of making same, is disclosed in the attached drawings, wherein:

FIGURE I is a perspective view showing a plurality of layers of the novel filter media disclosed and claimed herein, which are arranged in spaced superposed relationship, as they would be disposed in a trickling filter for filtering sewage fluid;

FIGURE II is a perspective view of a typical spacer member between the layers of filter media;

FIGURE III is a cross-sectional, elevational view of the spacer member in position spacing two layers of filter media;

FIGURE IV is a transverse sectional view taken on the line IV—IV of FIGURE III;

FIGURE V is a top plan view of a form which may be employed for making a module of filter media, showing the form partially filled with the tubular filter media components;

FIGURE VI is a side elevational view of the form shown in FIGURE V with the bolts and nuts for attaching the triangular halves of the forms in exploded view; and FIGURE VII is a top plan view of a section of a filter media module, illustrating how the individual tubular components thereof are welded together, to provide an integral assembly.

Numeral references are employed to designate the various parts shown in the drawings, and like numerals indicate like parts throughout the various figures of the drawings.

Referring first to FIGURE I, there is shown a plurality of layers 2 of filter media, each layer being made up of sections of tubes 1, of equal length, welded together in order to form integral layers.

It will be noted that each layer 2 is formed by a module of tubes, consisting of a square pattern of sixty-four individual units welded together. Such a module, comprising a square pattern, has been selected as an arbitrary size and pattern for illustration purposes, and it will be understood that modules consisting of various numbers of individual tubular sections, welded together in an integral unit, may be employed. It will be further understood that the desired number of modules, such as illustrated at 2, may be welded together in the manner hereinafter described, to provide layers of filter media of desired diameter.

The layers of filter media 2 are spaced apart by means of tubular spacer members 3, each said spacer member 3 including an enlarged diameter portion 4, and reduced cylindrical portions 5. The reduced cylindrical portions 5 are arranged to be inserted in opposite bores 19 of the filter media tubular members 1 so that the shoulders 7, provided by the enlarged diameter portions 4 thereof, abut against opposed ends of the tubular members 1, to separate and space the layers 2 of filter media when installed. The spacer members 3 also have bores 6 therethrough which allows for continuous passage and flow of sewage through the tubular members which they join, and through the bores 6. The spacer members 3 allow for ease in assembly of the layers of filter media, prevent lateral shifting with relation to each other, and provide for adequate spacing therebetween in aligned relationship, to permit circulation of air between the separate layers and through the bores of the tubular members 1 of filter media. The vertical spacing provided by the spacer members 3 is an important feature of the improved filter media disclosed and claimed herein, in that it provides for the maximum ventilation and flow of air through the filter media, and overall exposed surfaces thereof, to encourage the growth of aerobic bacteria.

The layers of filter media 2 are supported at the lower end by spacer members 8 arranged at the corners thereof, said spacer members 8 having a reduced portion, such as indicated at 5, on one end thereof, which is insertable in the bores of the tubular members 1 positioned at the corners of the lowermost layer of filter media 2.

It will be observed in FIGURE I that by making the filter media layers in uniform modules, with the tubular members 1 arranged in a square pattern, the bores 19 through the individual tubular members 1 in the separate layers can be arranged in vertical alignment, so that there will be a continuous and straight passage of sewage effluent therethrough, eliminating a circuitous path for the sewage effluent, and dead spots in the filter assembly, which could cause the collection of sloughed off bacterial growth. Such arrangement permits a continuous and straight-through washing action of fluid over all exposed surfaces of filter media at all times, to continuously wash away dead bacterial growth, to virtually eliminate sloughing off and clogging of passages.

In FIGURES V and VI is shown a suitable and convenient form or box for fabrication of individual modules of plastic filter media. As shown, the overall shape of the box is of square configuration, the dimensions of which may be as desired to provide a module filter media of any desired dimension.

The form is generally indicated at 9, and includes triangular sections 9a and 9b in the form of isosceles triangles, with the bases thereof arranged to come into aligned relationship, representing a diagonal line separating the two halves of the entire form. Each triangular half includes solid walls 10a–10b, and 10c–10d, respectively, and each is supported on a flat base 11 and 11a, respectively. Each triangular half 9a and 9b has a screen bottom 12 and 12a, respectively, therein, and each includes opposed attachment flanges 13a and 13, having corresponding alignment sleeves 14a and 14 welded thereto about aligned holes therethrough.

Bolts 15 and 15a may be passed through the alignment sleeves 14 and 14a, and secured therein by the nuts 16 and 16a, threaded thereon, to attach the triangular halves 9a and 9b together.

Preparatory to forming a module 2 of filter media in the form 9, a multiplicity of plastic tubes 1 of uniform length, are provided, preferably by cutting the individual sections of plastic tubes from a longer tubular section. The plastic tubes 1 are placed in the form 9 in a square pattern, as shown in FIGURE V, with the surfaces of adjacent tubes 1 in lightly contacting relation ship. By the term "square pattern," it is meant that the tubular sections 1 are so placed that lines drawn tangent to the contacting surfaces of the tubular members in both directions will be perpendicular, that the tangent lines so drawn in a common direction will be parallel, and straight lines drawn between the centerpoints of four adjoining tubular members 1 will form a square.

By so placing the tubular members 1 in such a square pattern, there is provided therebetween a passage 20 in the shape of an astroid or four-cusped hypocycloid, allowing free flow of sewage effluent therethrough, and exposes substantially the entire inner and outer surfaces of the tubular members 1 to fluid flow and air circulation, with the sole exception of the small areas 17 at the contacting points of the surfaces thereof.

The tubular members 1 are preferably made of plastic material, which can be very thin-walled, presenting maximum surface exposure area in a minimum amount of space, thus reducing the overall size of the filtration plant without decreasing the efficiency thereof.

Another advantage of the employment of plastic tubular filter media modules is that the plastic material is non-corrosive and is completely inert to commonly found municipal waste material and industrial wastes.

However, tubes 1, made of other material, formed in module patterns herein described, would perform satisfactorily.

After placing the plastic tubular members 1 in the form 9 in a square pattern, as shown in FIGURE V, the flanges 13 and 13a are drawn together by the bolts and nuts 15–15a, and 16–16a, sufficiently to apply a slight pressure between the contacting points of the tubular members 1 to maintain same in place. The form and plastic tubes may then be immersed in, or sprayed with, a plastic solvent to weld the contacting surfaces of the plastic tubes 1 together. Preferably the tubular members are made of polystyrene material, and the plastic solvent may consist of methyl ethel ketone.

After the solvent material has been applied, the module is allowed to drain through screen bottoms 12–12a, and the flanges 13 and 13a are drawn closer together to tightly clamp them together to cause the contacting surfaces to be maintained under pressure while the contacting plastic surfaces are dissolved by the solvent to fuse and harden same into an integral bond. The form is then loosened and the module 2 removed.

It will thus be seen that the tubular members 1 are welded together in modules, as shown in FIGURE I, and a plurality of such modules may be welded together to form layers of filter media of sufficient diameter.

It will be understood that other means of welding the tubular members together could be employed, such as the application of heat and/or pressure.

It is desirable that the individual tubular members 1 be the least possible diameter, since the smaller the diameter of the tubes contained in a given volume, the greater the surface area is provided. However, it has been found that it is desirable to have a minimum space between surface of not less than one-half inch. Therefore, the optimum diameter of the tubular members 1, in order to provide the greatest surface area, and yet maintain at least a one-half inch spacing between surfaces of tubular members, is one and one-half inch O.D., which, when placed in a square pattern, would provide a flow passage 20 between the separate tubes of one-half inch diameter or greater between the outer surfaces thereof, and a flow area of more than one inch through the individual bores 19. An advantage in the use of plastic tubes is that they can be made of thin walls. For instance, the walls can vary between .030 to .060 inch thickness. This means that a 1.500 inch O.D. tube would have an I.D. of from 1.440 to 1.380 inches.

By arranging the tubular members 1 in a square pattern, as hereinbefore described, each tube provides five vertical contact surface areas which are constantly exposed to vertical flow of fluid and air circulation thereover, these areas being the inner surface of the bore of the tube, and the outer surfaces thereof between the contacting points of the surfaces of adjacent tubes. The cylindrical areas of the surfaces of the tubular members 1, arranged in a square pattern so that a minimum of the outer surface thereof is unexposed, provides the maximum surface area in a minimum space, increasing the overall efficiency of the filter media at less cost, and with minimum annoyance occasioned by undesirable odors and breeding of flies.

Desirably, the individual plastic tubes 1 and the modules 2, formed thereby, should be approximately 12 inches long, and when spaced apart by the spacers 3 should be spaced 6 inches apart, and should be made up of a square pattern of eight tubular members 1 in each direction, each being one and one-half inch O.D. so as to provide a module 12 inches square. This provides for convenience in shipping and assembly. However, it will be understood that the modules, and filter layers formed thereof, could be made of any desired dimension of square pattern, could be of any desired length, and could be spaced apart any desired distance by any desirable spacer members. Although round tubular members 1 are desirable because they provide greater surface contact, tubular members of other shapes, such as octagonal, or rectangular, could be employed to maintain the desired vertical and lateral spacing and improved surface contact. In any event, the spacing and arrangement of the layers of modules in the trickling filter eliminates the necessity for a retaining wall thereabout, provides for maximum air circulation therethrough to promote the growth of aerobic bacteria, and provides for maximum exposure of surface area to air circulation and flow of sewage effluent thereover.

It will thus be seen that I have provided a filter media for use in trickling filter sewage disposal equipment, which provides a maximum available surface area in a minimum volume; maximum air circulation therethrough, reduces clogging and sloughing of filter organisms to a minimum, has unobstructed continuous passages vertically and laterally arranged therethrough, providing maximum efficiency, less undesirable odors, eliminating blind spots in the filter media, and reducing to a minimum the development of anaerobic bacteria therein.

It will be understood that other and further forms of our invention may be made without departing from the spirit and scope of the appended claim.

Having described our invention, we claim:

A trickling filter media assembly, including,
 a plurality of layers of filter media,
 said layers being vertically spaced apart,
 each layer comprised of a plurality of round tubular members
  arranged in a square pattern with contracting surface areas welded together providing vertical flow passages between and through the bores of the tubular members;
  the axes of the tubular members being longitudinally aligned and parallel to the direction of fluid flow and being so arranged that planes passing through the tangent points of the contacting surfaces in two directions will be perpendicular;
 means to space the layers apart comprising tubular members;
 each spacer member having an enlarged diameter with reduced end portions, the reduced end portions being arranged to extend into oppositely disposed bores of tubes of the layers of filter media.

(References on following page)

References Cited

UNITED STATES PATENTS

| | | | |
|---|---|---|---|
| 556,040 | 3/1896 | Alberger | 261—95 |
| 1,770,658 | 7/1930 | Kremser | 261—114 |
| 2,014,431 | 9/1935 | Foster | 210—150 |
| 2,051,545 | 8/1936 | Collins | 261—113 |
| 2,183,657 | 12/1939 | Page | 261—95 |
| 2,188,162 | 1/1940 | Schulhoff | 210—150 XR |
| 2,477,852 | 8/1949 | Bacon | 156—296 XR |
| 2,540,549 | 2/1951 | Rotter | 156—296 |
| 2,571,958 | 10/1951 | Slaughter et al. | 261—95 |
| 2,739,118 | 3/1956 | Carey | 261—95 |
| 2,786,793 | 3/1957 | Shobert | 156—296 |
| 2,839,280 | 6/1958 | McVay et al. | 261—113 |
| 2,874,844 | 2/1959 | Wanner | 210—150 |
| 2,992,516 | 7/1961 | Norton | 156—296 XR |
| 3,000,680 | 10/1961 | Zelenko | 220—97 |
| 3,039,749 | 6/1962 | Kohl et al. | 261—112 |
| 3,076,289 | 2/1963 | Gallo | 220—97 |

OTHER REFERENCES

Egan et al.: "Evaluation of Plastic Trickling Filter Media," Industrial Wastes, pp. 71–77, August 1960, vol. 5, No. 4, Scranton Pub. Co., 185 N. Wabash Ave., Chicago, Ill.

B. F. Goodrich: "King-Size Filter Makes Water Come Clean," Newsweek, Weekly Pubs. Inc., New York, N.Y., Apr. 2, 1962, pp. 44–45.

HARRY B. THORNTON, *Primary Examiner.*

HERBERT L. MARTIN, REUBEN FRIEDMAN,
*Examiners.*

T. R. MILES, *Assistant Examiner.*